(12) United States Patent
Cornolti et al.

(10) Patent No.: US 7,104,368 B2
(45) Date of Patent: Sep. 12, 2006

(54) DISK-BRAKE DISK

(75) Inventors: Raffaello Cornolti, Sorisole (IT); Silvio Persico, S. Paolo D'Argon (IT)

(73) Assignee: Freni Brembo S.p.A, Bergamo (IT)

( * ) Notice: Subject to any disclaimer, the term of this patent is extended or adjusted under 35 U.S.C. 154(b) by 0 days.

(21) Appl. No.: 10/504,699

(22) PCT Filed: Jan. 14, 2002

(86) PCT No.: PCT/IT02/00012

§ 371 (c)(1),
(2), (4) Date: Sep. 15, 2004

(87) PCT Pub. No.: WO03/058087

PCT Pub. Date: Jul. 17, 2003

(65) Prior Publication Data

US 2005/0284712 A1   Dec. 29, 2005

(51) Int. Cl.
*F16D 65/12* (2006.01)
(52) U.S. Cl. .............................. 188/218 XL; 188/18 A
(58) Field of Classification Search .............. 188/18 A, 188/218 XL
See application file for complete search history.

(56) References Cited

U.S. PATENT DOCUMENTS

| | | | |
|---|---|---|---|
| 3,542,166 A * | 11/1970 | Harrison | 188/218 XL |
| 6,267,210 B1 | 7/2001 | Burgoon et al. | 188/218 XL |
| 6,357,561 B1 * | 3/2002 | Ruiz | 188/218 XL |
| 6,561,298 B1 * | 5/2003 | Buell et al. | 180/221 |
| 6,672,419 B1 * | 1/2004 | Buell et al. | 180/221 |
| 6,745,875 B1 * | 6/2004 | Wirtanen | 188/218 XL |
| 6,806,050 B1 * | 10/2004 | Zhou et al. | 188/218 XL |
| 2001/0032761 A1 | 10/2001 | Ruiz | 188/218 XL |
| 2004/0182660 A1 * | 9/2004 | Cavagna et al. | 188/218 XL |
| 2005/0145452 A1 * | 7/2005 | Yamamoto | 188/218 XL |

FOREIGN PATENT DOCUMENTS

WO   WO0196758   12/2001 ................ 65/12

* cited by examiner

*Primary Examiner*—Thomas Williams
(74) *Attorney, Agent, or Firm*—Sofer & Haroun, LLP

(57) ABSTRACT

The disk includes a bell (2), an annular braking band (3) and coupling (11, 12, 13) between bell and band. The bell (2) is provided with a plurality of openings (6) along its periphery, the band (3) is provided in the vicinity of its inner edge with a corresponding plurality of slots (9) having parallel sides in the radial direction, while the coupling includes a plurality of dragging elements (11), each of which engages with an opening (6) of the bell and a slot (9) of the band to create a tangential constraint between bell (2) and band (3). In order to reduce the specific pressure between the dragging elements (11) and the slots (9), each of the dragging elements (11) includes a part (16) with two parallel opposite faces (20) that engage with the parallel sides of the slot (9) in such a manner as to be in contact with them.

3 Claims, 2 Drawing Sheets

DISK-BRAKE DISK

RELATED APPLICATION

Figure 1:
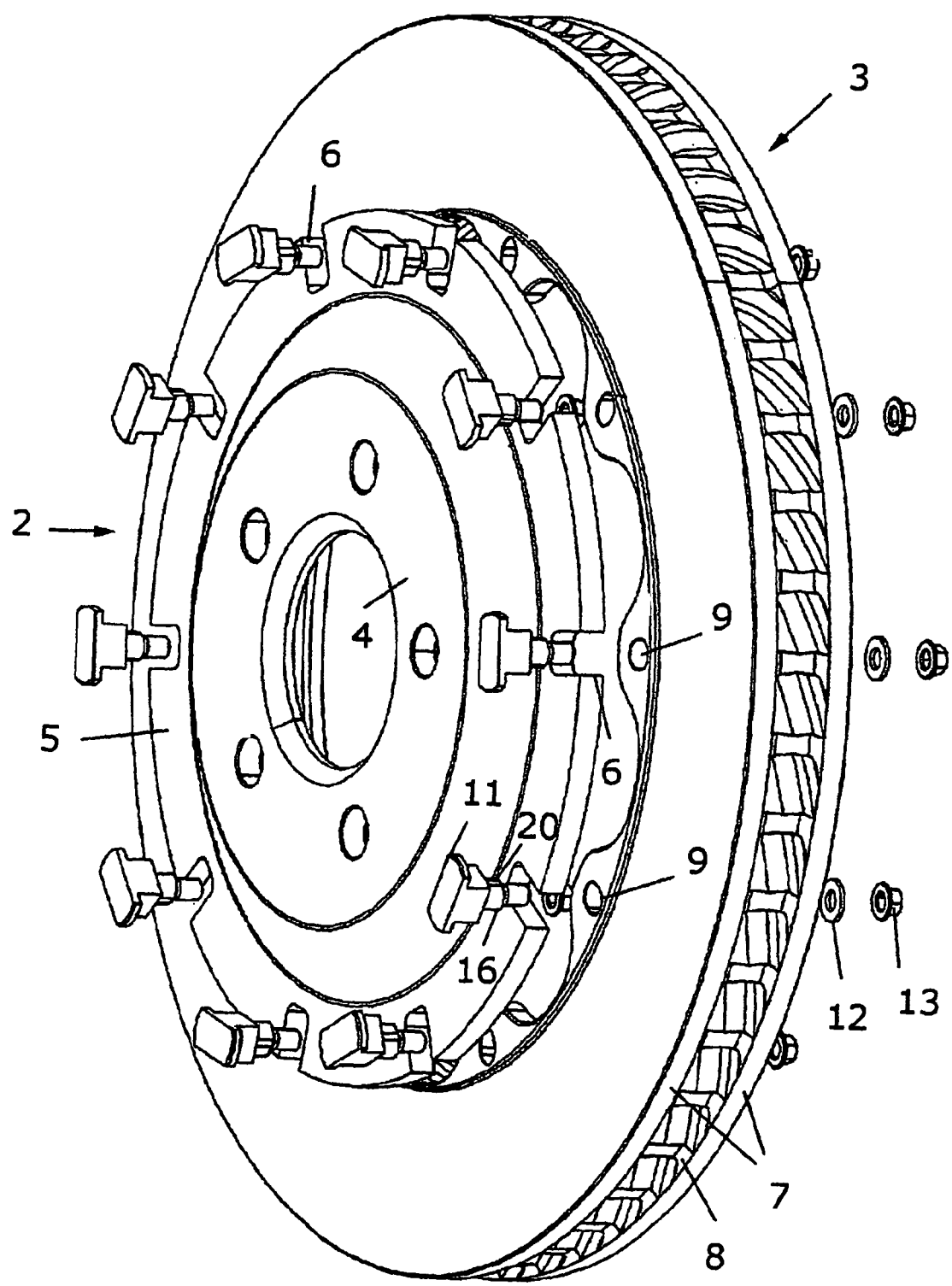

This application is a National Phase Patent Application of and claims the benefit of priority from PCT Patent Application No. PCT/IT02/00012, filed on Jan. 14, 2002, the entirety of which is incorporated herein by reference.

The present invention relates to disk brakes.

A disk brake of the type used as a braking device in motor vehicles comprises an annular cast-iron disk, commonly known as the braking band, which is integral with a hub—commonly known as the bell—that is connected to a wheel of the vehicle, and a caliper which is fixed to the hub-carrier, is disposed around the braking band, and is provided with brake linings or pads. The caliper acts on the pads by means of an hydraulic operation, so as to bring the pads into contact with the two opposed braking surfaces of the braking band. If the wheel with the respective bell and braking-band assembly is rotating, the action of the caliper brings about a braking effect due to the friction between the pads and the braking surfaces of the braking band with consequent heating of the braking band and the disk as a whole. Since the heating of the band is greater than that of the bell, the disk tends to become deformed. To obviate this difficulty and to provide high-performance braking devices, there have been proposed disks in which the braking band and the bell are constituted by two distinct parts connected to one another by coupling means made in such a manner as not to create any rigid radial constraints. One known disk, for example, comprises a cast-iron braking band, a bell made of aluminium alloy and coupling means comprising a series of steel pins, each of which engages with an opening of the bell and a corresponding slot in the braking band. The engagement with the bell aperture is substantially devoid of play, whereas the engagement with the slot is such as to allow some radial play, thus rendering possible dilation differences between braking band and bell. Though this type of disk avoids deformations due to temperature differences between band and bell, they bring with them another drawback deriving from the forces that develop between the organs assuring coupling with the bell and, above all, the braking band. These forces lead to plastic deformations of the coupling zones. The greater play produced by these deformations is very accentuated, so that the disk, or at least the braking band, will have to be replaced when the braking surface is still in a good condition. More particularly, the plastic deformation is caused by the high specific pressure that develops along the lines of contact between the pins and their respective seatings in the bell and the braking band, as a result of which the materials of the bell and the braking band become gradually deformed and bring into being a steadily increasing radial play that will permit undesired relative rotations between the bell and the braking band. Every time the brake is operated, the recovery of this play will trigger a hammering action of the contact surfaces that tends to further accentuate the plastic deformations and therefore the enlargement of the openings in the bell and, to an even greater extent, of the slots in the braking band.

The present invention therefore sets out to propose a disk in which the undesired effect described above is eliminated or, at least, greatly attenuated.

The aim is attained by realizing the disk-brake disk as set forth below.

Figure 2:
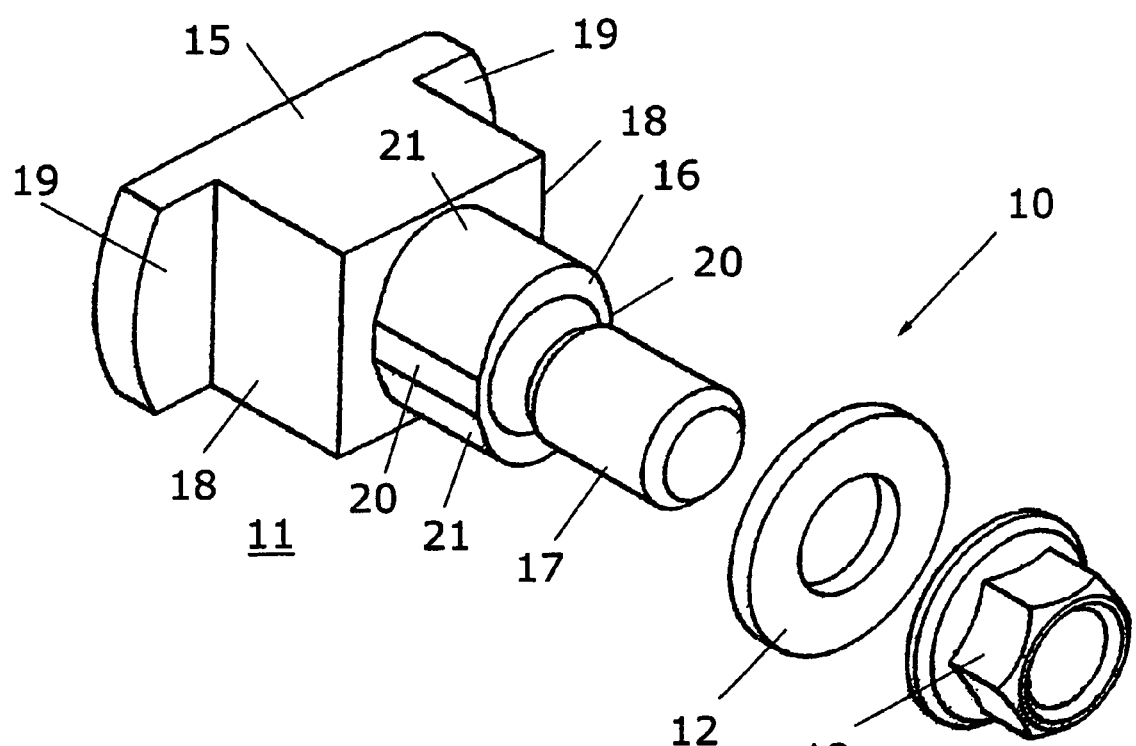

The invention will be better understood from the detailed description of a particular embodiment given hereinbelow, the said embodiment being merely an example and should not therefore be regarded as in any way limitative, together with the accompanying drawings, of which:

FIG. 1 shows an exploded axonometric view of a disk-brake disk in accordance with the invention, and FIG. 2 shows an exploded axonometric view of an enlarged detail of the disk of FIG. 1.

FIG. 1 shows a bell 2 and a braking band 3 of a disk-brake disk in accordance with the invention as two parts detached from each other, but in correct axial alignment. The bell 2 consists of a single piece made of aluminium alloy and comprises a perforated central plate 4 for fixing the disk to the hub of a wheel and a peripheral ring 5 with a plurality (ten in the present example) of radial recesses 6 with parallel sides, preferably distributed uniformly along its circumference. The braking band 3 consists of two substantially annular cast-iron plates 7 that are parallel with each other and are joined together by spacers 8. The annular plate 7 facing the bell 2 is crossed by a plurality of slots 9 in the vicinity of its inner edge and distributed in such a manner as to match the radial recesses 6 of the bell. The slots 9 have two opposite sides parallel and these sides extend in the radial direction.

The bell 2 and the braking band 3 are kept together by coupling means 10 (FIG. 2), each of which comprises a dragging element 11 with a cylindrical and threaded terminal part 17, a washer 12 and a nut 13.

The dragging element 11 is made of a single piece, preferably steel, consisting—over and above said cylindrical terminal part 17—of a first part 15 shaped in such a manner as to fit into one of the corresponding radial recesses 6 of the bell 2 with possibility of movement substantially limited to the radial direction and a second part 16 shaped in such a manner as to fit into one of the slots 9 of the braking band. More particularly, the part 15 of each dragging element 11 has its two opposite parallel faces 18 separated by a distance that is only slightly smaller than the width of the recess, so that the element 11 can slide freely between the sides of the recess when it is in position within the latter.

Furthermore, each element 11 is provided with two protuberances that delimit one end of the two opposite faces 18 in such a way as to form two teeth 19.

The axial dimension of the opposite faces 18 is such as to exceed the thickness of the peripheral ring 5 of the bell by a small predetermined amount, so that when the element 11 is in position it will permit the bell 2 to have a certain amount of axial play with respect to the braking band 3.

The part 16 has two opposite faces 20 that are parallel to both each other and the faces 18 of the part 15. The distance between the opposite faces 20 is equal to the width of the slot 9, so that when the dragging element 11 is in position, the faces 20 will be facing the flat and parallel surfaces of the slot and be substantially in contact with them. In the radial direction the part 16 is delimited by two opposite convex surfaces 21 that are substantially complementary with the corresponding opposite concave surfaces of the slot 9. The axial dimension of the part 16 is slightly smaller than the thickness of the braking band in the vicinity of the slot, so that the dragging element 11 can be rigidly connected to the braking band 3 by tightening the nut 13 on the threaded cylindrical part 17.

For assembly purposes the dragging elements 11 are placed in their respective recesses 6 of the bell 2 with the teeth 19 in contact with the peripheral ring 5, and the whole is then brought alongside the braking band 3 in such a manner as to make each of the parts 16 of the dragging elements 11 enter into the corresponding slot 9, after which the washers 12 are slipped onto the threaded cylindrical parts 17 and the lock nuts 13 are screwed up and tightened.

The disk-brake disk that has just been described makes it possible to avoid the prior art difficulties discussed at the beginning, because the coupling between bell and braking band is not obtained by means of contact lines, but rather by means of contact surfaces, namely the faces 18 in contact with the sides of the recesses 6 of the bell and the faces 20 in contact with the parallel sides of the slots 9 of the braking band. Since the specific pressure between the parts in contact is much smaller than in the prior art, the plastic deformations are likewise considerably reduced if not altogether eliminated.

It should be noted that the embodiment described above does not call for the fabrication of braking bands specifically designed to permit the practical implementation of the invention, it being perfectly possible to use existing stocks of braking bands intended for the production of prior-art disks, this with considerable advantages in terms of resource optimization.

Although only a single embodiment of the invention has here been described, it is clear that numerous variants and modifications are possible without overstepping the scope of the inventive concept. For example, advantageous results can also be obtained by using bells with holes in place of the radial recesses and dragging elements connected to the bell substantially without play and with the possibility of sliding radially in their respective slots of the braking band.

The invention claimed is:

1. A disk-brake disk comprising:
   a bell, an annular braking band and coupling means between the bell and the braking band, the bell being provided with a plurality of openings spaced along its periphery, the braking band being provided with a corresponding plurality of slots situated in the vicinity of its inner edge and having parallel sides in the radial direction, while the coupling means has a plurality of dragging elements, each of which engages with an opening of the bell and a slot of the braking band to create a tangential constraint between the bell and the braking band, wherein each of the dragging elements has a part with two parallel opposite faces that engage with the corresponding parallel sides of the slot in such a manner as to be in contact with them, and wherein the part of the dragging element that engages with its respective slot is coupled with the slot in a substantially play-free manner and wherein the openings of the bell are shaped as recesses that extend radially from the periphery of the bell and have parallel sides and each of the dragging elements has another part with two parallel opposite faces that engage with the sides of a respective recess in such a manner as to be in contact with them.

2. A disk in accordance with claim 1, wherein the dragging element is provided with a threaded cylindrical terminal part and at the opposite end has two protuberances that delimit the two opposite faces of said other part and each of the coupling means comprises a nut capable of being screwed onto the threaded cylindrical terminal part of a respective dragging element.

3. A disk in accordance with claim 2, wherein the two parallel opposite faces of said other part have an axial dimension greater than the thickness of the bell in the vicinity of the radial recess and the two parallel opposite faces of the part of the dragging elements that engages with a slot of the braking band have an axial dimension smaller than the thickness of the braking band in the vicinity of the slot.

* * * * *